United States Patent [19]

Jeenicke et al.

[11] 4,250,858
[45] Feb. 17, 1981

[54] INPUT-OUTPUT UNIT FOR MICROPROCESSOR CONTROLLED IGNITION OR INJECTION SYSTEMS IN INTERNAL COMBUSTION ENGINES

[75] Inventors: Edmund Jeenicke, Schwieberdingen; Winfried Klötzner, Maulbronn; Clemens Meichle, Vaihingen; Manfred Schenk, Fellbach; Ingo Gorille, Oberriexingen, all of Fed. Rep. of Germany

[73] Assignee: Robert Bosch GmbH, Stuttgart, Fed. Rep. of Germany

[21] Appl. No.: 56,960

[22] Filed: Jul. 12, 1979

[30] Foreign Application Priority Data

Aug. 9, 1978 [DE] Fed. Rep. of Germany ....... 2834796
Nov. 22, 1978 [DE] Fed. Rep. of Germany ....... 2850534

[51] Int. Cl.³ ............................ F02D 5/00; F02P 5/04
[52] U.S. Cl. .................................. 123/480; 123/486; 123/487; 123/416; 123/417
[58] Field of Search ........ 123/32 EB, 32 EC, 32 ED, 123/32 EA, 117 D; 364/431

[56] References Cited

U.S. PATENT DOCUMENTS

| 3,846,760 | 11/1974 | Ironside | 123/32 EB |
| 3,898,962 | 8/1975 | Honig et a. | 123/32 EB |
| 4,063,539 | 12/1977 | Gorille et al. | 123/117 D |
| 4,155,332 | 5/1979 | Yaegashi et al. | 123/32 EB |
| 4,174,688 | 11/1979 | Honig et al. | 123/117 D |
| 4,176,629 | 12/1979 | Kawai et al. | 123/32 EA |

Primary Examiner—P. S. Lall
Attorney, Agent, or Firm—Frishauf, Holtz, Goodman & Woodward

[57] ABSTRACT

An input-output unit carries out some of the operations previously carried out in the microcomputer controlling the ignition, injection, etc. processes so that the number of bits in the microprocessor can be reduced. The input-output unit includes a counter which furnishes speed-dependent or angle-dependent signals. During a predetermined angle of rotation or while a particular speed-dependent value is counted and down, a frequency proportional to the quantity of air in the air inlet is counted, the resultant air number transferred to the microprocessor where it is modified. The modified air number can be counted down in the same counter which was used to count down the speed-dependent signals. The time required for counting down the modified air number determines the injection time and/or the closing time for an electronic switch in the primary circuit of the ignition coil. When the angle-dependent signal is used, a further counter counts down the air number several times, each time generating an interrupt signal. The latter count is in the microprocessor and when a predetermined number has been received, the microprocessor furnishes a terminate signal ending the controlled process.

12 Claims, 8 Drawing Figures

INPUT-OUTPUT UNIT FOR MICROPROCESSOR CONTROLLED IGNITION OR INJECTION SYSTEMS IN INTERNAL COMBUSTION ENGINES

CROSS-REFERENCE TO RELATED APPLICATIONS AND PUBLICATIONS:

Electronics, Jan. 20, 1977, page 102 ff,
Electronic Design 1, Jan. 4, 1977, page 34 ff,
Elektronik, 1977, Vol. 4, page 48 ff
SAE-Paper Nr. 750 432, "Application of Microprocessors to the Automobile", page 65 ff
etz-b, Vol. 28, 1976, No. 15, page 496 ff,
Computer, August 1974, page 33 ff
U.S. Application Ser. No. 916,827 filed June 9, 1978 now U.S. Pat. No. 4,204,256 assigned to the same assignee and hereby incorporated by reference into the present application,
U.S. Pat. No. 4,063,539,
RCA Handbook "User Manual for the CDP 1802 Cosmac Microprocessor MPM-201A" and "RCA, Integrated Circuits, SSD-210, 4-76".

The present invention relates to means for controlling the ignition and/or fuel injection in an internal combustion engine, and, more particularly, to those instances in which the control is carried out by a microcomputer.

BACKGROUND AND PRIOR ART

All of the cross-referenced applications and publications contain control systems for internal combustion engines in which microprocessors are used. Further, hard wired computers are known, for example as described in U.S. Pat. No. 4,063,539. Such hard wired computers, of course, are not nearly as versatile as microprocessor systems. In the known microprocessor systems, very complicated programs for processing externally applied signals indicative of then-present operating parameters, for example, are required. These complicated programs in turn require a large amount of storage and, in particular, a large amount of fixed storage such as in a ROM. Further, if less than eight bits, for example, are used in the program, a decrease in accuracy at high engine speeds results.

In U.S. application Ser. No. 916,827 filed June 9, 1978 now U.S. Pat. No. 4,204,256 and assigned to the same assignee, an inputoutput unit is described in which a number of mathematical operations are carried out which obviate some of the abovementioned problems. However, the particular problem of determining the injection and/or ignition timing as a function of the quantity of air in the inlet pipe of the engine is not addressed.

The Invention

It is an object of the present invention to supply an input-output unit of the above-described type and, in particular, a unit wherein mathematical operations are carried out so that the microprocessor itself can be constructed with a relatively low number of bits, in particular eight bits. In particular, both the ignition timing and the fuel injection timing are to be the result of countdown processes. The input-output unit is further to be easily manufactured in an integrated circuit form and is to make possible a number of different counting processes under program control for which the microprocessors of the present generation are not as yet usable.

Wherever possible, one counter in the input-output unit is to be used to count down a number of signals. This again will decrease the manufacturing effort for an integrated circuit or the number of components required in a discreet circuit.

In the present invention, first counting means are provided which furnish a first counting number indicative of engine speed. The first counting number is modified by the microprocessor and the so-modified number is applied to preset inputs of a second counter. The second counter is preset to the modified counting number and a signal having a preselected frequency is applied to the counting input of the second counter. A first counting time interval therefore elapses while the second counter counts from the preset number to a predetermined end number. A sensor furnishes air quantity signals having a repetition rate corresponding to the quantity of air in the inlet pipe of the engine. A third counter counts these air quantity signals during the so-created first counting time interval and furnishes a third counting number corresponding to the so-counted number of signals. Coupling means are provided which couple the third counting number to the first counting means. The first counting means counts down between the third counting number and a predetermined final number, thereby creating a second counting time interval. Finally, activating means are provided which activate one cyclically recurring process, such as fuel injection or ignition timing, during a time corresponding to the second counting time interval.

In a preferred embodiment, the accuracy of the system is improved by increasing the first counting time interval when the speed of the engine exceeds a predetermined speed. This increase in the time interval must, of course, be compensated for at a later time. This method allows an exact determination of the actual quantity of air in the inlet at high speeds with sufficient accuracy, without having to provide for very high counting values, i.e. large counters during low engine speeds.

DRAWINGS ILLUSTRATING A PREFERRED EMBODIMENT

DESCRIPTION OF THE PREFERRED EMBODIMENT

Figure 1:
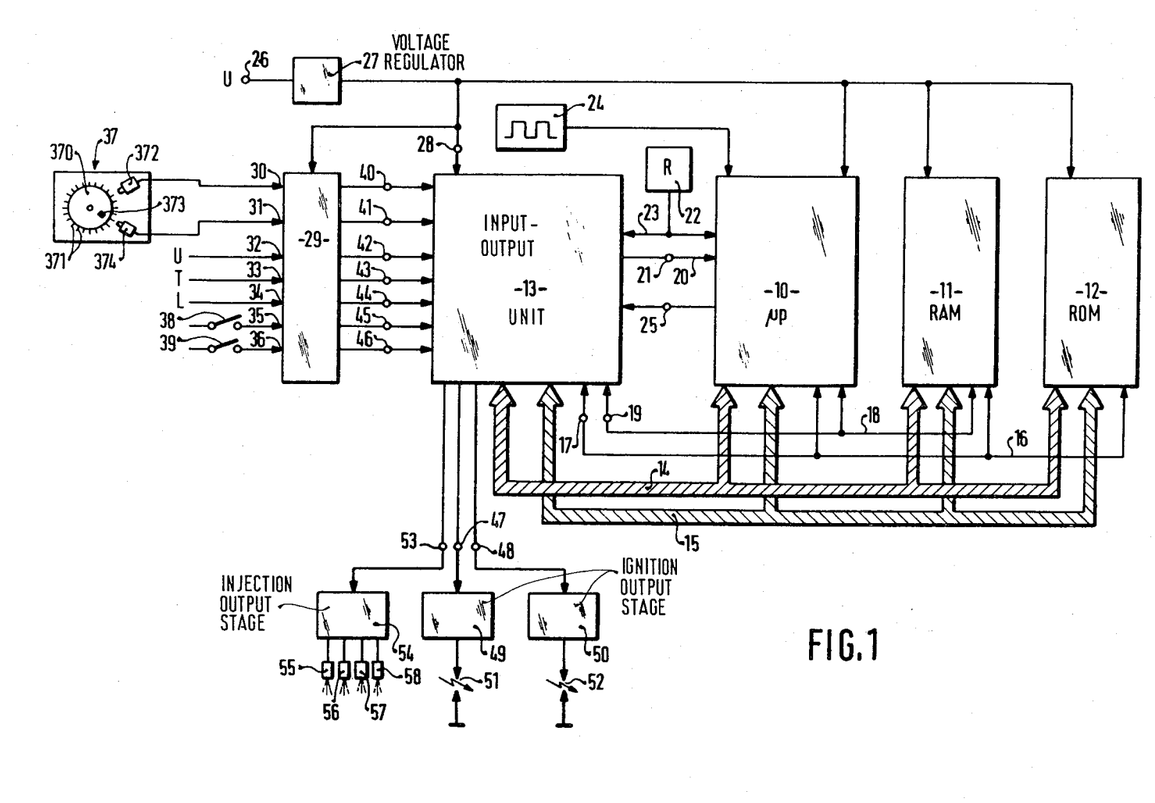
FIG. 1 is a block diagram of a known microcomputer system for internal combustion engines.

The presently known microcomputer system illustrated in FIG. 1 contains a microprocessor 10 with a random access memory 11, that may be regarded as a kind of operating memory, a read-only memory 12 for storing fixed values and instructions, such a memory being known by the acronyms ROM, PROM or EPROM, and an input-output unit 13, all connected by a data bus 14 and an address bus 15. As required by the information content to be transferred and by the number of selectable addresses, such a data bus 14 can, for example, consist of eight separate conductors and the address bus 15, for example, of three individual conductors. In other words, an eight bit data bus and a three bit address bus are typical, but the data bus may need more lines if longer "words" are to be stored and the address bus likewise if there are to be more selectable addresses.

A read-enable conductor 16 connects the components 10, 11 and 12, and is connected to a terminal 17 of the input-output unit 13, serving to call out the applied or stored information. A write-enable conductor 18 connects the components 10 and 11 and is connected to the terminal 19 of the input-output unit 13 for putting information in temporary or buffer stores.

An interrupt lead 20 extends from the input-output unit 13 over a terminal 21 to the microprocessor 10. This connection serves to interrupt a program currently running in the microprocessor when certain information is present. A "clear" lead extends from a reset circuit 22 to microprocessor 10 and to the input-output unit 13. It serves to set certain initial conditions, for example, when a program begins.

A clock pulse generator 24 provides a basic clock frequency to the microprocessor 10. A lower frequency, preferably obtained from the clock pulse frequency by frequency division, is supplied over a terminal 25 to the input-output unit 13.

A voltage regulator circuit 27 is provided which is fed by a supply voltage at its terminal 26 to provide a stabilized output voltage to a terminal 28 and to all units which include electronic components.

An input circuit 29 has seven inputs 30–36 connected with external signal generators. The operating conditions of a machine such as the internal combustion engine of a vehicle can, at any time, thereby be made available to the computer. The signal generator 37 connected with the inputs 30 and 31 consist of a gear wheel 370 preferably connected with the crank shaft of an internal combustion engine on which there are provided a multiplicity of teeth 371. The passage of these teeth is sensed by a first sensor 372, each ferromagnetic tooth producing a flux change in the inductive sensor 372 to produce a voltage pulse. The speed dependent signal sequence thus produced is supplied to the input 30. Instead of ferromagnetic teeth, other marks could also be provided, the passage of which could be detected by other kinds of sensors. Thus a disk can be magnetized stripwise in the circumferential direction or a pattern of holes can be provided which can be detected by optical devices.

A reference mark 373 is also provided on the disk 370. This reference mark 373 can, of course, be provided on another disk or on another rotating part of the machine. The reference mark 373 is detected by a second sensor 374 and the reference mark signal is supplied to the input 31. Further information from the internal combustion engine or from the vehicle are supplied, for example, supply voltage U, temperature T, throttle position α, position of the throttle switch 38 and position of the starting switch 39, at the respective inputs 32 to 36. The number of these additional information sources can be extended still further and is not limited to the particular kinds of information here illustrated. The illustrated seven sources of information at the inputs 32 to 36 are shaped, freed of disturbances and digitalized so far as necessary in the input circuit unit 29. On the output side of the input circuit 29, the same information is provided over the terminals 40–46 in more usuable form to the input-output unit 13. To the extent the information supplied to the input circuits 29 is present in analog form, it is converted into digital form by analog-digital converters provided in the input circuits 29. For example, a voltage controlled oscillator may be used. Signal shaping may be done by use of Schmitt triggers, while removal of noise can be accomplished by well known circuits for elimination of transients and circuits for protection against over-voltage.

Two outputs of the input-output unit are shown connected over the terminals 47 and 48 with switching output stages 49 and 50 respectively. In the illustrated case, these are ignition output stages. Such ignition output stages contain, as is well known, a semiconductor switch in the primary current circuit of an ignition coil, in the secondary current circuit of which at least one spark gap 51, 52 or sparkplug is connected. A further output stage 54 for controlling fuel injection by four injection nozzles 55–58 is also connected to input-output unit 13.

The manner of operation of the microprocessor system of the kind shown in FIG. 1 is well known and widely described in the literature. In addition to the references named in the introduction, the operation of such system is described principally in the users' handbooks of the various microprocessor manufacturers, in which there is described in detail both the construction and the manner of connection of the individual components, as well as their mode of operation and their programming. Assembly variations and circuit possibilities and recommendations are given in a great amount of detail. An example of such explanations and instructions are the handbooks of RCA entitled "User Manual for the CDP-1802 Cosmac Microprocessor MPM-201A" and "RCA, Integrated Circuits, SSD-210, 4-76". Within the framework of a program stored in the read-only memory 12, data applied externally to the input-output unit 13 is processed by the microprocessor 10 in comparison or correlation with data permanently stored in the read-only memory. The computed results, in the present case the signals controlling injection or ignition timing, are supplied to the output stages 49, 50 and 54 for carrying out the desired commands. Final results and intermediate results are partly stored intermediately in the random access memory 11 in order to be called up as needed by the microprocessor.

The number and variety of microprocessors, read-only memories and random access memories is not limited by the representation given in FIG. 1, but can be extended to any extent necessary in accordance with the data to be processed, the scope of the program and the scope of the stored data. This range of choice of course depends upon the component type used in the particular case and from its operating and storage capacities, that is, for example, from the number of bits to be operated upon at one time or to be stored.

Figure 2:
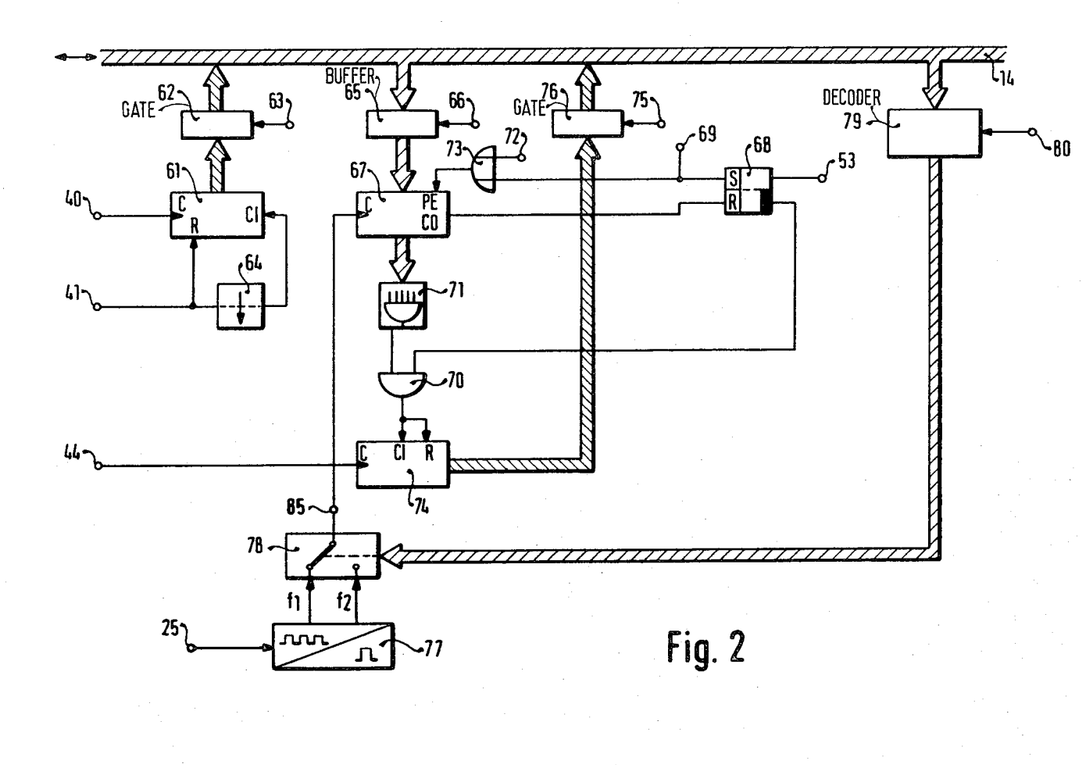
FIG. 2 is a first embodiment of an input-output system in accordance with the present invention.

In the embodiment of the present invention shown in FIG. 2, terminal 40 which receives the speed signal is connected to the counting input C of a first counter 61. The counting outputs of counter 61 are connected to data bus 14 through a first gate 62. Gate 62 is preferably a circuit of a plurality of transmission gates connected in parallel and controlled by a signal applied at a terminal 63. Terminal 51, which carries the reference mark signal, is connected to the reset input R of counter 61 and is further connected via a timing circuit 64 to the carry in input CI of counter 61. Timing circuit 64 is preferably constructed as a counter which counts signals applied thereto at a predetermined frequency up to a particular count. Circuits 61–64 which allow a number corresponding to the then-present engine speed to be computed can be constructed in any one of a number of ways, one of these being given in U.S. Pat. No. 4,204,256.

Data bus 14 is also connected through a first buffer storage 65 which is enabled for read in by a signal on a terminal 66. The output of buffer storage 65 is connected to the set inputs of a second counter 67. The carry out output CO of counter 67 is connected to the reset input R of a flip-flop 68. The set input of flip-flop 68 is controlled by a signal at a terminal 69. One output of flip-flop 68 is connected to a terminal 53 while its second, complementary output is connected to the first input of an AND gate 70. The counting output of counter 67 is applied via a decoding stage 71 to the second input of AND gate 70. If the lowest count on the counter is to result in an output signal, decoding stage 71 may be constructed as an AND gate. Alternatively, output CO can be used instead of this decoding stage 71. Terminal 69, as well as a further terminal 72 are connected via an OR gate 73 to the preset enable input PE of second counter 67.

Terminal 44 is connected to the counting input C of a third counter 74. The CI input of counter 74 and its reset input R are connected to the output of AND gate 70. The counting outputs of third counter 74 are connected over a second gating circuit 76 to data bus 14. Gating circuit 76 is controlled by a signal applied at a terminal 75.

Terminal 25 which receives the clock frequency is connected to the input of a frequency divider stage 77 which supplies two frequencies different from each other by a factor of four at two different outputs. Either of these two frequencies f1, f2, may be applied to the clock input of counter 67 by means of a selector switch 78. Selector switch 78 is controlled by the output of a decoder 79 whose input is connected to data bus 14. A switch command initiate signal is applied at a terminal 80 connected to stage 79.

The input signals for the above-described circuit as well as for the circuit shown in the remainder of the figures are synchronized or timed with the clock frequency. The synchronization stage is necessary to achieve this purpose are not shown since they are described in detail in German Patent DE-PS 2,504,843, FIG. 4. The circuit shown in this publication, which is hereby incorporated by reference, also acts as a frequency doubler. Amplifier stages which may be required at the various outputs of the system are also not shown. These can, of course, be supplied in accordance with need and in dependence upon the particular signal levels.

Figure 3:
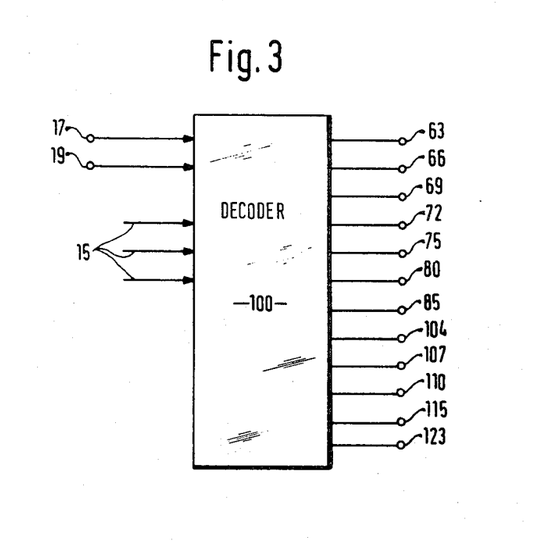
FIG. 3 shows a decoder for control of switching circuits connected to the data bus as shown in FIGS. 2 and 7.

The decoder circuit shown in FIG. 3 has inputs connected to address bus 15 and inputs 17, 19 connected to the read enable conductor 16 and the write enable conductor 18. Terminals 63, 66, 69, 72, 75, 80, 85, 104, 107, 110, 115 and 123 are connected to the outputs of decoder 100. Decoder 100 is part of input-output unit 13 and controls the operation of the gates, buffer storages, decoder stages and counters connected to the above-mentioned output terminals. Depending upon the received input signals, one or more of the output terminals of decoder 100 will carry a signal which will activate the particular stage or circuit connected thereto. For example, a signal may then be able to pass through a gate, or a counter may be preset to a particular counting value. The sequence in which these commands are carried out is determined by the program in the microprocessor which results in commands furnished over lines 15, 16 and 18.

Operation

The operation of input-output unit 13 as shown in FIGS. 2 and 3 in cooperation with the system shown in FIG. 1 will be explained also with reference to FIGS. 4 and 5. One of the operating parameters to be supplied to the system is the volume of air taken in, as measured by air volume measuring apparatus which is well known and not shown. This value is important for controlling the amount of fuel injected and also useful in determining the ignition timing. If the air volume measuring apparatus furnishes an analog output signal, this must be converted to a signal whose frequency is proportional to the amount of air taken in. This is done in input circuit 29. The signal having this frequency is applied at terminal 44 and the so-furnished signal is counted on counter 74. The count takes place during a predetermined time determined by counter 67. The contents of counter 74 can, at any instant, be transferred to the microprocessor via gate 76 under control of the signal at terminal 75. The time determined by counter 67 can be changed by changing the frequency of the signals applied to its counting input and, alternatively can also be changed by presetting the counter to different values. The latter values are supplied by microprocessor 10 via data bus 14 and are applied to counter 67 via buffer storage 65.

In order to compute the correct ignition timing, the engine speed n must also be supplied to the system. This is accomplished in stages 61 through 64. Timing circuit 64 is triggered by a reference mark signal at terminal 41. During the time timing circuit 64 is in the stage during which counting takes place, counter 61 counts the signals supplied by sensor 37. The final count on the counter is therefore speed dependent and can be read out through gate 62 in response to a signal applied at terminal 63. It is then available to the microprocessor and can be used in computing the amount of fuel to be injected. For fuel injection it is preferable to use the reciprocal of the speed dependent count or a normalized value A/n in order to have numbers which can be readily processed. The division takes place in the microprocessor but could also take place in the input-output unit if a digital division circuit which is in itself known is provided. The result Z1 is transferred to counter 67 in response to a signal at terminal 72. The so-transferred value is then counted down by means of a predetermined frequency f. During all of this time, which is herein referred to as a period, a "1" signal is present at the output of decoder 71. The "1" signal at the output of decoder 71 enables the input CI of counter 74. Therefore the frequency which is proportional to the volume of air taken in is counted during this time in counter 74. The count on counter 74 at the end of the above-mentioned period is proportional to the uncorrected injection time. It can be read out over gate 76 and is corrected in the microprocessor as a function of other parameters. These other parameters are applied to the microprocessor via the input-output unit and are used to multiply the uncorrected injection time. Such further parameters can be converted to counting values in similar fashion as was the air volume signal and can be suppled to the microprocessor via a gating stage. In response to a signal at terminal 69, a modified injection time count Z2 is transferred via buffer storage 65 to counter 67. Counter 67 then counts down the so-preset value. During the countdown flip-flop 68 is set and furnishes a signal U53 at output terminal 53. This signal determines the injection time and is ended by a carry signal at the output CO of counter 67 which resets flip-flop 68.

Figure 4:
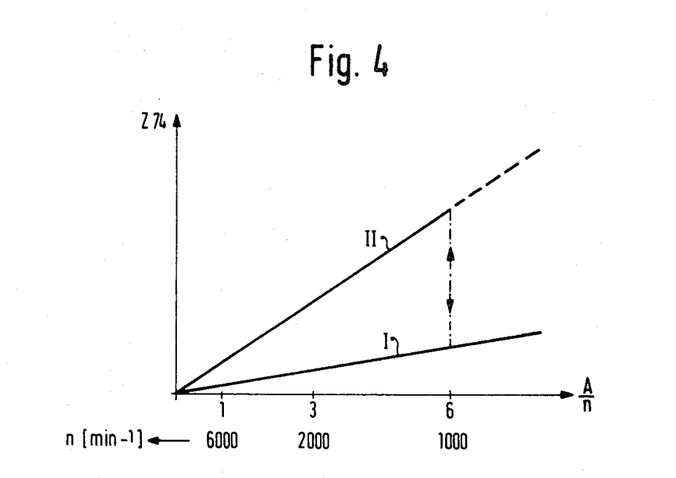
FIG. 4 illustrates the accuracy of the count on a counter in FIG. 2 as a function of engine speed.
Figure 5:
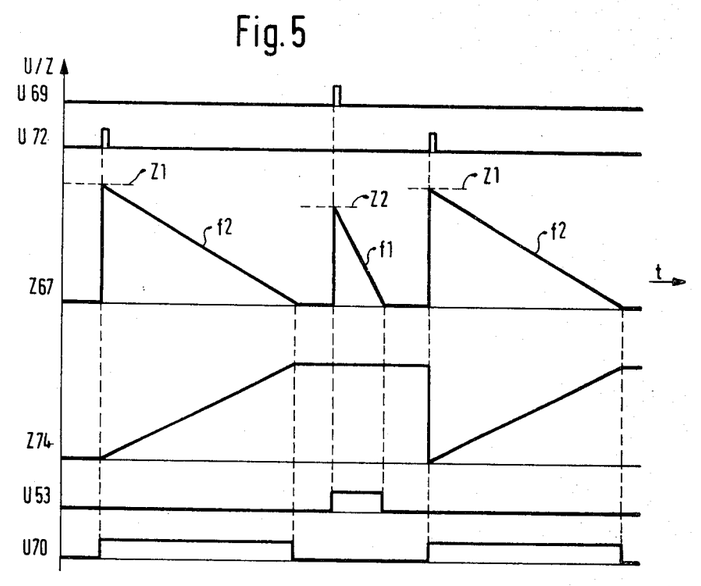
FIG. 5 shows signal variations at different parts of the circuit of FIG. 2 for explaining the operation thereof.

Reference to FIG. 4, curve 1 shows that for no-load operation of under 1,000 revolutions per minute the above-mentioned process yields a good accuracy. However, at higher engine speeds the time periods become so short and the resulting counts so small that the accuracy is substantially decreased. The curve could, of course, be modified throughout by the use of higher frequencies. This, however, has the disadvantage that the counters must then be designed for the high counting values which would occur during low engine speeds (see curve II).

In order to avoid this situation, the gating time for counter 74 is increased by a predetermined factor when the engine speed becomes less than a predetermined minimum speed, as for example, 1,000 revolutions per minute. In the illustrated example, this factor is a factor of four.

When the speed of the engine exceeds the predetermined minimum speed, this fact is recognized in microprocessor 10 and decoder 79 furnishes a signal which switches selector switch 78 so that the lower frequency f2 is applied to the counting input of counter 67 instead of the previously applied frequency f1. At the end of the countdown, starting with the count Z1, the frequency is switched back to frequency f1 which is required for counting down the count of Z2. When the engine speed is below the predetermined minimum speed, all countdowns take place with the frequency f1. Since the time during which counter 74 counts is increased by a factor of four, the counter will reach a correspondingly higher count. After correction by other engine and vehicle operating parameters in microprocessor 10, the count must be redivided by the factor of four in order to compensate for the gate time which had been increased by a factor of four. The factor of four is advantageous in that the corresponding multiplications and divisions can be achieved by simple shifting of the counting value in a register. Any other factor which is a power of two would be equally useful.

Instead of dividing by the predetermined factor in order to compensate for the increased gate time, the countdown of count Z2 can take place at a frequency increased by this factor. For this purpose, a third frequency would have to be available.

A further equivalent solution would be to decrease the period for the count when the engine speed is below the predetermined minimum speed so that the maximum count on counter 74 is not exceeded. It is also possible that, instead of changing the counting frequency for counter 67 in order to increase or lengthen the gate time for counter 74, the value to which counter 67 is preset, namely count Z1, may be multiplied or divided by a corresponding factor.

Figure 6:
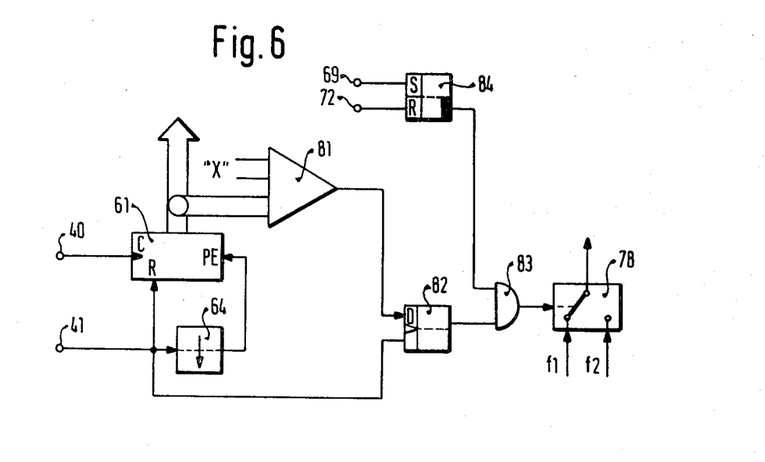
FIG. 6 is a block diagram showing the control of a selector switch in FIG. 2 as a function of engine speed.

The final count on counter 61 may be used to determine either in the microprocessor or in the input-output unit whether the actual engine speed is below or above the predetermined minimum speed. For this purpose, the count on counter 61 is periodically transferred to the microprocessor, where it is compared with permanently stored comparison values. If such a comparison takes place in input-output unit 13, a circuit as shown in FIG. 6 can be used. Components identified by reference numerals 40, 41, 61 and 64 are the same as those shown by the same reference numerals in FIG. 2. The counting outputs of counter 61 are further connected to the inputs of a digital comparator 81. The other comparison inputs of comparator 81 are supplied with a hard wired count of X which corresponds to the count on counter 61 when the engine reaches the predetermined minimum speed. The output of comparator 81 is connected to the D input of a D flip-flop 82, whose clock input is connected to terminal 41. The output of flip-flop 82 is connected through an AND gate 83 to the control input of selector switch 78. Terminal 89 is connected to the set input S and terminal 72 with a reset input R of a flip-flop 84, whose complementary output is connected to a further input of AND gate 83.

Operation of the Circuit of FIG. 6

When the engine speed is less than the predetermined minimum engine speed, the count on counter 61 does not reach the value X. A "0" signal appears therefore at the output of flip-flop 82 and therefore at the output of AND gate 83. Selector switch 78 therefore continuously connects the counting input of counter 87 to the frequency f1. If the predetermined minimum engine speed and therefore the count of X are exceeded, flip-flop 82 is set by a trigger signal at terminal 41 and therefore switches selector switch 78 to the frequency f2, if the second input of AND gate 83 also carries a "1" signal. This is the case when flip-flop 84 was reset by a reset signal U72. The next signal U69 resets flip-flop 84 causing AND gate 83 to be blocked. Selector switch 78 again connects the counting input of counter 67 with the frequency f1 until a new reset signal U72 is received.

Figure 7:
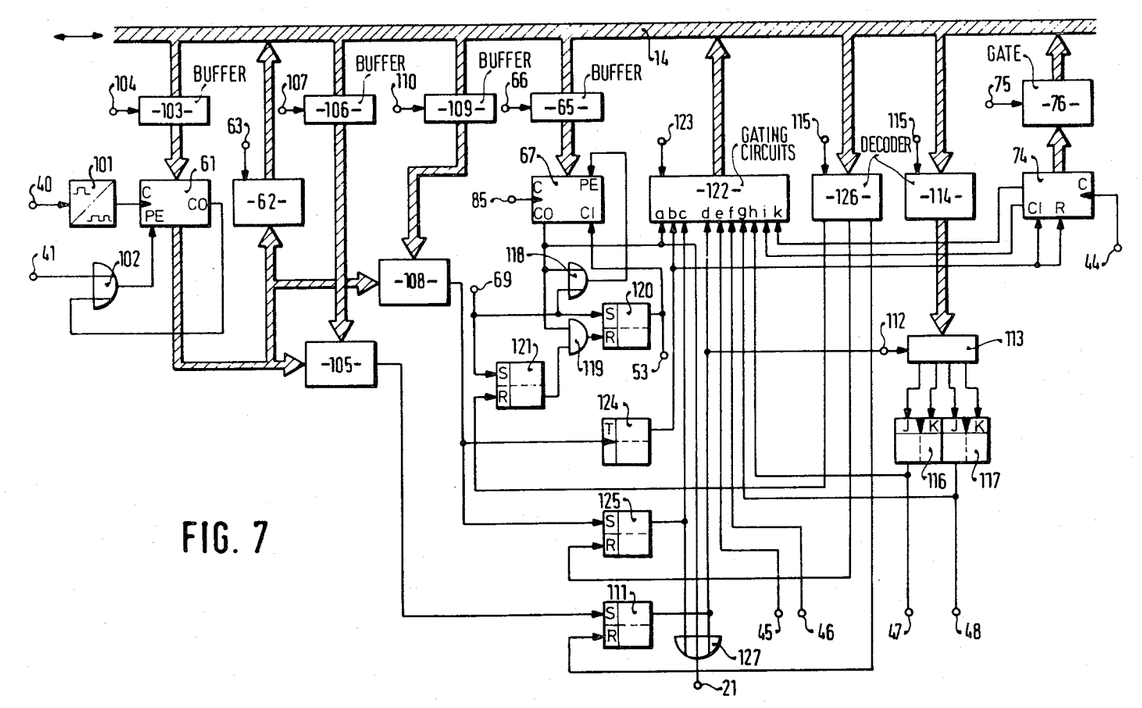
FIG. 7 shows a second embodiment of the present invention.

A second embodiment of the invention is shown in FIG. 7. Here terminal 40 which receives the speed-dependent signal is connected to the input of a frequency multiplier stage 101. The output of frequency multiplier stage 101 is connected to the counting input C of first counter 61. Terminal 41 which receives the reference mark signal is connected through an OR gate 102 with the preset enable input of counter 61. The CO output of counter 61 is connected to a further input of OR gate 102. A buffer storage 102 is connected between data bus 14 and the counting inputs of counter 61. Data furnished on data bus 14 is applied to the counting inputs of counter 61 in response to a signal at a terminal 104. The counting outputs of counter 61 are connected to a first set of comparison inputs of a comparator 105 and are connected to data bus 14 via a set of transmission gates 62. Data is transmitted from the outputs of counter 61 to the data bus in response to a signal applied at a terminal 63. The second comparator inputs of comparator 105 are connected to data bus 14 through a further buffer storage 106. Buffer storage 106 is controlled by a signal at a terminal 107. The counting outputs of counter 61 are further connected to the first comparator inputs of a comparator 108 whose second comparator inputs are connected to data bus 14 via a buffer storage 109. Buffer storage 109 is controlled by a signal applied at a terminal 110.

The output of comparator 105 is connected to the set input S of a flip-flop 111. The output of flip-flop 111 is applied at a terminal 112 to selector logic 113. The selection of individual output stage channels takes place under the control of signals from data bus 114 via a first decoder stage 114. The outputs of decoder stage 114 are also connected to selector logic 113 under a control of a signal applied at a terminal 115. A detailed embodiment of circuit blocks 113, 114 is given in the cross-referenced publications. The J and K inputs of two J K flip-flops 116, 117 are connected to the outputs of selector logic 113. One output each of flip-flops 116, 117 is connected with one of the terminals 47, 48 for control of output stages 49, 50. In a simpler embodiment, only one output stage controlled by only one flip-flop may be provided. The high voltage distribution to the individual cylinders of the internal combustion engine then takes place by means of a mechanical high voltage distributor.

As in the first embodiment, counter 67 is connected through a buffer storage 65 with data bus 14. Its CO output is connected to its preset input PE through an OR gate 118 and is further connected to the reset input R of a flip-flop 120 via an AND gate 119. The output of flip-flop 120 is connected to the CI input of counter 67 and is further connected to output terminal 53. Terminal 69 is connected to a further input of OR gate 118, as well as to the set inputs S of flip-flop 120 and a further flip-flop 121. The complementary output of flip-flop 121 is connected with a further input of AND gate 119.

To indicate the presence of a carry out signal to microprocessor 10, the CO output of counter 67 is connected to the input a of a back check gate 122. The outputs of back check gate 122 may be applied to data bus 14 under control of a signal at a terminal 123. Further inputs b through k of the back check stage are connected to the outputs of two further flip-flops 124, 125 as well as the output of flip-flop 111. They are further connected to terminals 45, 46, the outputs of 116, 117 and the two highest value bit outputs of counter 74. Input a, c and d of back check gate 122 are connected to inputs of an OR gate 127 whose output is connected to terminal 21 to furnish "interrupt" signals.

The output of second comparator 108 is connected with a counting input of a flip-flop 124 which may, for example, be a T flip-flop. It is further connected to the set input of a flip-flop 125. The output of flip-flop 124 is connected with the CI input and the R input of counter 74. As in the first embodiment, counter 74 is connected through a gating stage 76 to data bus 14. The C input, that is the counting input, of counter 74 receives a signal which has a frequency proportional to the amount of air. This is applied to terminal 44. Counter 74 can be used for several purposes, so that the counting input can also be connected through a switching arrangement as shown on FIG. 2 with some fixed frequencies or other frequencies which are dependent upon operating parameters. In addition to computing a counting value which is used to derive the injection time, counter 74 can also be cyclically operated to compute other counting values which may, for example, determine the position of a solenoid valve, the throttle pressure for automatic gearing, the odometer, the electrical control of a clock as well as the control and monitoring of step motors. This cyclical control is effected by the microprocessor, the application of the different frequencies to the counter being controlled by a decoder 79 as illustrated in the first embodiment.

The control of the reset inputs R of flip-flops 111, 121 and 125 is effected by a second decoder stage 126 whose inputs are connected to data bus 114. The second decoder 126 is controlled by the signal applied to terminal 115.

OPERATION OF THE CIRCUIT OF FIG. 7

Figure 8:
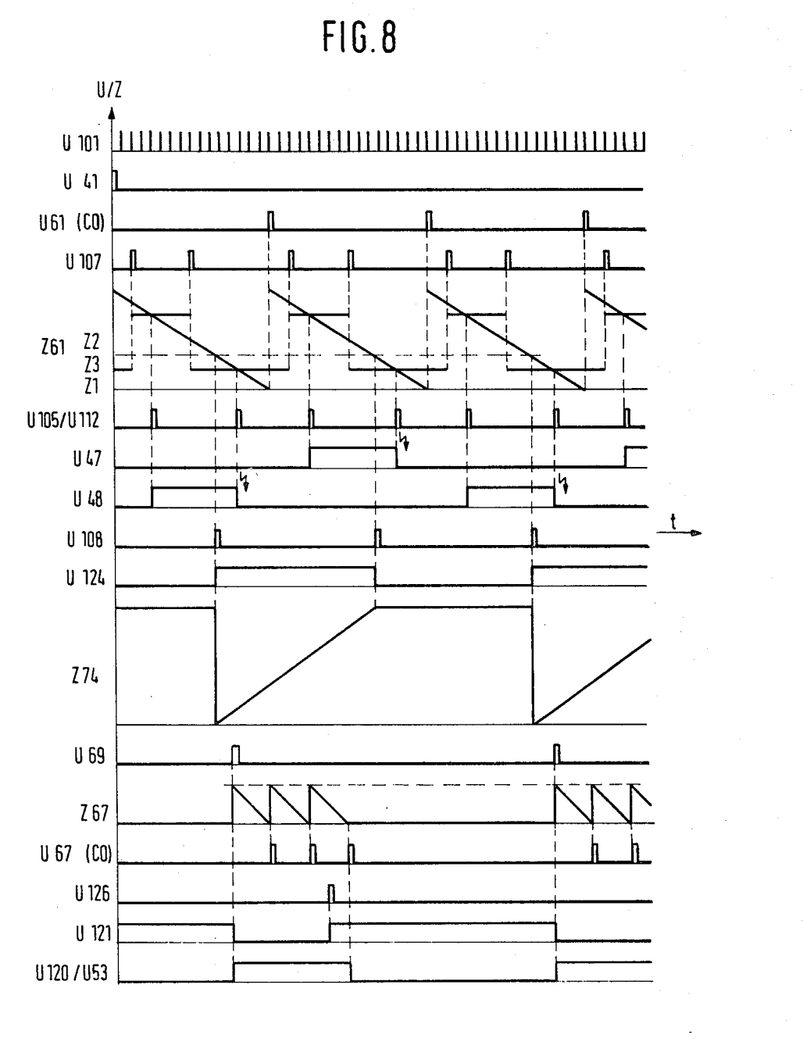
FIG. 8 is a timing diagram of signals of various points in the circuit of FIG. 7 used in conjunction with the explanation of the operation of the latter.

The operation of the circuit shown in FIG. 7 will be shown also with reference to the diagrams of FIG. 8. The speed-dependent signal applied at terminal 40 is frequency multiplied in stage 101, for example doubled and is applied as a sequence U101 to the counting input of counter 61 which is a down counter. The diagram shown in FIG. 8 correspond to a case wherein the speed of the engine remains constant. In response to the reference mark signal U41, counter 61 is preset to the number stored in buffer storage 103. The number in buffer storage 103 was transferred thereto from data bus 14 in response to a signal U104. The number in counter 61 is then counted down in response to the signal sequence U101, until the count of zero is reached and a signal is furnished at output CO. The CO signal causes counter 61 to be preset again. It thus constitutes an additional internally derived reference mark signal. The number transferred into buffer storage 103 is variable and is determined by the program in dependence on the then-present value of an operating parameter. The count at the output of counter 61 can be transferred to microporcessor 10 via data bus 14 and gate 62 in response to a signal at terminal 63.

Buffer storage 106 receives counting values or numbers present on data bus 14 under control of the signal sequence U107. In the example shown, these values alternate between Z1 and Z2. The so-stored values are applied to the second comparator inputs of comparator 105. If the count on counter 61 reaches the value Z2, comparator 105 furnishes a first output signal and, when counter 61 reaches the count of Z1, it furnishes a second output signal. These signals are shown as signal sequence U105/U112. The signals in this signal sequence cause flip-flop 111 to set, while the flip-flop is reset by signals at the output of decoder 126. The output signals of flip-flop 111 control selector logic 113 in conjunction with decoder stage 115 to cause flip-flops 116, 117 to be alternately set and reset, so that the outputs of the flip-flops furnish the signal sequence U47 and U48. This can be achieved by simple logic circuits. One possibility is indicated in the cross-referenced U.S. patent application. Signal sequences U47 and U48 alternately control output stages 49 and 50 and, in an ignition system, determine the time that the electrical switch in series with the primary current of an ignition coil is closed. Thus, the end of the signal causes a spark to be generated. The above-described operation of the circuit of FIG. 7 for control of ignition processes is described in the cross-referenced U.S. application.

Values supplied by data bus 14 are transferred into buffer storage 109 under control of signal sequence U110. These values can change as a function of operating parameter values, but in the circuit of FIG. 8, under quiescent conditions, are pictured as counting value Z3. If the number in counter 61 reaches the value Z3, a short output signal U108 is generated at the output of comparator 108. These signals are transferred back via flip-flop 125 and back check gate 122 to microprocessor 10 and further furnish an interrupt signal via OR gate 127. An interrupt signal, which is well known in microprocessor applications functions to interrupt the program then running in the microprocessor. Further, each signal in signal sequence U108 causes flip-flop 124 to switch states, so that the output of flip-flop 124 is a signal sequence U124. Counter 74, which has previously been reset, counts the frequency applied at terminal 44, that is the frequency proportional to the quantity of air intake, for the duration of the signal U124. The count on counter 74 at the end of the signal U124 is proportional to the value Q/n, where Q is the quantity of air intake per unit time and n is the engine speed. The count on counter 74 can be transferred to the microprocessor via gate 76 at any time prior to the next generation of signal U124. This value is subject to corrections within the microprocessor, for example corrections as a function of temperature, air pressure, etc. The corrected signal is transferred to buffer storage 65 in response to a signal at terminal 66.

Signal U69 causes both flip-flops 120, 121 to be set and, after passing through OR gate 118 is applied to the PE input of counter 67 so that the value stored in buffer storage 65 is transferred to this counter. Counter 67 is a down counter. It therefore begins to count down with either a fixed or a selectable frequency until such time as a signal appears at output CO. This signal is denoted by U67. Signal U67 causes an interrupt signal to be furnished at terminal 61 and the presence of the signal is indicated to microprocessor 10 via stage 122. Further, counter 67 is preset again via OR gate 118. This process continues cyclically until flip-flop 121 is reset via stage 126. The reset signal is furnished by the microprocessor in dependence on its program on the basis of the incoming interrupt signals. Because flip-flop 121 has been reset, the following CO signal from counter 67 causes resetting of flip-flop 120 via AND gate 119.

Signal U53 which is present while flip-flop 120 is set determines the injection time and controls the corresponding injection process via output stage 54. The use of a multiplicity of counting processes for determining the injection signal in counter 67 allows a simple multiplication of binary numbers which would be relatively difficult and costly to accomplish in the microprocessor. Of course the end of signal U53 can also be directly determined by a signal U126 by applying this signal directly to the reset input of flip-flop 120.

These circuit conditions which are to be fed back to microprocessor 10 and which are at least in part stored in flip-flops, can be applied to the microprocessor in response to a signal at terminal 123 and can be utilized therein for correction of the different counting values. Those parts of input-output unit 13 which are not relevant to the present invention were omitted for the sake of simplicity even though, of course, they are essential for the functioning of the overall system. These portions include the sensors which sense the remaining parameters of the internal combustion engine, as well as the processing to which these signals are subjected. This information can, however, be derived readily from the cross-referenced publications and applications.

In the table given below, listed for purposes of example and illustration, are some commercially available components usable in the above-described circuits. The listed components in this case are components made available under the trademark RCA, with one exception in which the source is identified parenthetically, and these components are designated by type numbers by which they are normally identified.

| Component | Type designation(s) |
|---|---|
| Microprocessor 10 | CDP 1802 D or CDP 1802 CD |
| Random access memory 11 | CDP 1824 |
| Read only memory 12 | CDP 1833 CD |
| Counters 61, 67, 74 | 4029 |
| Buffer stores 65 | 4042 |
| Comparator 105, 108 | MC 14 585 (Motorola) |
| Gate stages 62, 76 | 4016 |
| Decoder stages 71, 79 | CD 4556 |
| Selector switches 78 | 4016 or CD 4052 |
| Frequency divider stage 115 | CD 4040 |

Although the invention has been described with reference to a particular illustrative embodiment, it is evident that variations and modifications are possible within the inventive concept. Thus, it has already been mentioned that more than one input-output unit can be used by the same microprocessor for controlling different operations of the same machine, for example, fuel injection and ignition timing of an internal combustion engine, and, of course, other kinds of combined operations can be provided either by extending the scope of operation of an input-output unit, or by utilizing two or more input-output units, or both.

We claim:

1. In a system for controlling cyclically recurring operations of an internal combustion engine having an air inlet pipe, said system having a microprocessor, a permanent storage, a temporary storage, an address bus and a data bus connecting said microprocessor to said storages, means for furnishing a speed signal indicative of the speed of said engine, and means for furnishing a sequence of air quantity signals having a frequency corresponding to the quantity of air in said air inlet pipe, an input-output unit comprising first counting means (61) connected to said speed signal furnishing means for furnishing a first counting number indicative of said speed of said engine;

means (62) for furnishing a second counting number (Z1) signifying a modified value of said first counting number;

second counting means (67) having a counting input terminal, a plurality of preset input terminals, and a plurality of counting output terminals;

first coupling means (66, 65, 73) for applying said second counting number to said preset input terminals, thereby presetting said second counting means;

second coupling means (78) for applying a signal having a preselected frequency to said counting input terminal, whereby a first counting time interval elapses while said second counting means counts from the so-preset number to a predetermined end number;

third counting means (74) connected to said air quantity signal furnishing means for counting said air quantity signals during said first counting time interval only and furnishing a third counting number (Z2) corresponding to the so-counted number of signals;

third coupling means (76) for applying said third counting number to said preset input terminals of said second counting means thereby presetting said second counting means;

wherein said second counting means further comprises means for counting from said third counting number to a predetermined final number thereby creating a second counting time interval;

and further comprising means (68) for activating at least one of said cyclically recurring operations during a time interval corresponding to said second counting time interval.

2. In a system for controlling cyclically recurring operations of an internal combustion engine having an air inlet pipe, such system having a microprocessor, a permanent storage, a temporary storage, an address bus and a data bus connecting said microprocessor to said storages, means for furnishing a speed signal indicative of the speed of said engine, and means for furnishing a sequence of air quantity signals having a frequency corresponding to the quantity of air in said air inlet pipe, an input-output unit comprising first counting means (61) connected to said speed signal furnishing means for furnishing a first counting number indicative of said speed of said engine;

means (62) for furnishing a second counting number (Z1) signifying a modified value of said first counting number;

second counting means (67) having a counting input terminal, a plurality of preset input terminals, and a plurality of counting output terminals;

first coupling means (66, 65, 73) for applying said second counting number to said preset input terminals, thereby presetting said second counting means;

second coupling means (78) for applying a signal having a preselected frequency to said counting input terminal, whereby a first counting time interval elapses while said second counting means counts from the so-preset number to a predetermined end number;

third counting means (74) connected to said air quantity signal furnishing means for counting said air quantity signals during said first counting time interval only and furnishing a third counting number (Z2) corresponding to the so-counted number of signals;

third coupling means (76) for applying said third counting number to said preset input terminals of said second counting means thereby presetting said second counting means;

wherein said second counting means further comprises means for counting from said third counting number to a predetermined final number thereby creating a second counting time interval;

further comprising means (68) for activating at least one of said cyclically recurring operations during a time interval corresponding to said second counting time interval;

wherein said second counting means comprises a single counter; and wherein said first and third coupling means alternately applies said second and third counting numbers to said preset input terminals.

3. In a system for controlling cyclically recurring operations of an internal combustion engine having an air inlet pipe, such system having a microprocessor, a permanent storage, a temporary storage, an address bus and a data bus connecting said microprocessor to said storages, means for furnishing a speed signal indicative of the speed of said engine, and means for furnishing a sequence of air quantity signals having a frequency corresponding to the quantity of air in said air inlet pipe, an input-output unit comprising first counting means (61) connected to said speed signal furnishing means for furnishing a first counting number indicative of said speed of said engine;

means (62) for furnishing a second counting number (Z1) signifying a modified value of said first counting number;

second counting means (67) having a counting input terminal, a plurality of preset input terminals, and a plurality of counting output terminals;

first coupling means (66, 65, 73) for applying said second counting number to said preset input terminals, thereby presetting said second counting means;

second coupling means (78) for applying a signal having a preselected frequency to said counting input terminal, whereby a first counting time interval elapses while said second counting means counts from the so-preset number to a predetermined end number;

third counting means (74) connected to said air quantity signal furnishing means for counting said air quantity signals during said first counting time interval only and furnishing a third counting number (Z2) corresponding to the so-counted number of signals;

third coupling means (76) for applying said third counting number to said preset input terminals of said second counting means thereby presetting said second counting means;

wherein said second counting means further comprises means for counting from said third counting number to a predetermined final number thereby creating a second counting time interval;

further comprising means (68) for activating at least one of said cyclically recurring operations during a time interval corresponding to said second counting time interval; and wherein said second counting number has a value inversely proportional to said speed of said engine.

4. In a system for controlling cyclically recurring operations of an internal combustion engine having an air inlet pipe, such system having a microprocessor, a permanent storage, a temporary storage, an address bus and a data bus connecting said microprocessor to said storages, means for furnishing a speed signal indicative of the speed of said engine, and means for furnishing a sequence of air quantity signals having a frequency corresponding to the quantity of air in said air inlet pipe, an input-output unit comprising first counting means (61) connected to said speed signal furnishing means for furnishing a first counting number indicative of said speed of said engine;

means (62) for furnishing a second counting number (Z1) signifying a modified value of said first counting number; second counting means (67) having a counting input terminal, a plurality of preset input terminals, and a plurality of counting output terminals;

first coupling means (66, 65, 73) for applying said second counting number to said preset input terminals, thereby presetting said second counting means;

second coupling means (78) for applying a signal having a preselected frequency to said counting input terminal, whereby a first counting time interval elapses while said second counting means counts from the so-preset number to a predetermined end number;

third counting means (74) connected to said air quantity signal furnishing means for counting said air quantity signals during said first counting time interval only and furnishing a third counting number (Z2) corresponding to the so-counted number of signals;

third coupling means (76) for applying said third counting number to said preset input terminals of said second counting means thereby presetting said second counting means;

wherein said second counting means further comprises means for counting from said third counting number to a predetermined final number thereby creating a second counting time interval;

further comprising means (68) for activating at least one of said cyclically recurring operations during a time interval corresponding to said second counting time interval; further comprising means (81) connected to said speed signal furnishing means for furnishing a high speed signal when said speed of said engine exceeds a predetermined speed; and further comprising means connected to said high speed signal furnishing means and said second counting means for increasing said second counting time interval in response to said high speed signal.

5. A system as set forth in claim 4, wherein said means for increasing said second counting time interval comprises means (77) for furnishing a first and second signal having, respectively, a first and second preselected frequency; and wherein said second coupling means comprises a selector switch for connecting said first and second signal to said second counting input terminal of said second counting means in the absense and presence of said high speed signal, respectively.

6. A system as set forth in claim 5, wherein said second preselected frequency is a predetermined submultiple of said first frequency.

7. A system as set forth in claim 6, wherein said predetermined submultiple is a factor of one-half.

8. A system as set forth in claim 4, further comprising gating means (76) for applying said third counting number to said data bus and said microprocessor means, means in said microprocessor means for correcting said third counting number in accordance with then-present values of operating parameters of said engine and in accordance with said lengthening of said second counting time interval, thereby creating a corrected third counting number; and wherein third coupling means comprises means for applying said corrected third counting number to said second counting means.

9. A system as set forth in claim 5, wherein said first counting means comprises means for counting down said third counting number at said first and said second preselected frequency when said speed of said engine is less than and exceeds said predetermined speed, respectively.

10. In a system for controlling cyclically recurring operations of an internal combustion engine having an air inlet pipe and a shaft, said system having a microprocessor, a permanent storage, a temporary storage, an address bus and a data bus connecting said microprocessor to said storages, means for furnishing a speed signal indicative of the speed of said engine, and means for furnishing a sequence of air quantity signals having a frequency corresponding to the quantity of air in said air inlet pipe, an input-output unit comprising means (61, 101-103) for furnishing an angle signal signifying the angle of rotation of said shaft relative to a reference position;

means (74) connected to said angle signal furnishing means for counting said air quantity signals during predetermined ones of said angles of rotation and furnishing a first air number corresponding to the number of so-counted signals;

first buffer means (76) connected to said air quantity signal counting means for transferring said first air number to said data bus and said microprocessor, said microprocessor furnishing a modified air number in response to said first air number;

means (65, 67) for receiving said modified air number, counting from said modified air number to a predetermined number furnishing an output signal upon reaching said predetermined number and repeating said counting from said modified air number to said predetermined number in response to said output signal, whereby said receiving means creates a time interval extending for at least a first and second one of said counts;

and activator means (120) connected to said receiving means for maintaining at least one of said cyclically recurring operations during a time period corresponding to the so-created time interval.

11. A system as set forth in claim 10, further comprising means (127) for applying each of said output signals to said microprocessor to constitute an interrupt signal; and wherein said microprocessor comprises means for counting said interrupt signals and furnishing a terminate signal (U126) when the so-counted number of interrupt signals is equal to a preselected number;

further comprising means (121, 119) for applying said terminate signal to said activating means so that said activating means terminates said cyclically recurring operations following receipt of said terminate signal.

12. A system as set forth in claim 11, wherein said activating means comprises a flip-flop; and wherein said applying means comprises means for resetting said flip-flop in response to the joint presence of said terminate signal and one of said output signals.

* * * * *